United States Patent
Dölker

(10) Patent No.: US 9,752,528 B2
(45) Date of Patent: Sep. 5, 2017

(54) METHOD FOR OPERATING AN INTERNAL COMBUSTION ENGINE

(71) Applicant: MTU Friedrichshafen GmbH, Friedrichshafen (DE)

(72) Inventor: Armin Dölker, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 13 days.

(21) Appl. No.: 14/758,732

(22) PCT Filed: Dec. 19, 2013

(86) PCT No.: PCT/EP2013/003869
§ 371 (c)(1),
(2) Date: Jun. 30, 2015

(87) PCT Pub. No.: WO2014/106531
PCT Pub. Date: Jul. 10, 2014

(65) Prior Publication Data
US 2015/0369159 A1  Dec. 24, 2015

(30) Foreign Application Priority Data
Jan. 2, 2013 (DE) .......... 10 2013 000 061

(51) Int. Cl.
F02D 41/40 (2006.01)
F02D 41/30 (2006.01)
F02D 41/04 (2006.01)
F02D 41/02 (2006.01)
F02D 41/14 (2006.01)

(52) U.S. Cl.
CPC ....... *F02D 41/3005* (2013.01); *F02D 41/021* (2013.01); *F02D 41/045* (2013.01); *F02D 41/401* (2013.01); *F02D 2041/1422* (2013.01); *F02D 2041/1432* (2013.01); *Y02T 10/44* (2013.01)

(58) Field of Classification Search
CPC .. F02D 41/3005; F02D 41/021; F02D 41/045; F02D 41/401; F02D 41/3011; F02D 41/3064; F02D 41/3076; F02D 41/34; F02D 41/345; F02D 41/40; F02D 2041/1422; F02D 2041/1432; F02D 2041/1417; Y02T 10/44
USPC .......... 123/436; 701/103–106, 110
See application file for complete search history.

(56) References Cited

U.S. PATENT DOCUMENTS

| 4,924,835 A | 5/1990 | Denz |
| 6,047,681 A | 4/2000 | Scherer et al. |
| 7,021,293 B2 | 4/2006 | Dölker |

(Continued)

FOREIGN PATENT DOCUMENTS

| DE | 19630213 C1 | 7/1997 |
| DE | 102004008261 B3 | 9/2005 |

(Continued)

*Primary Examiner* — Hai Huynh
(74) *Attorney, Agent, or Firm* — Lucas & Mercanti, LLP; Klaus P. Stoffel

(57) ABSTRACT

A method and an arrangement for operating an internal combustion engine. In the method, an injection start is calculated by a filter, starting from a standard injection start and at least one of the filter parameters is selected in accordance with the operating mode of the internal combustion engine.

8 Claims, 16 Drawing Sheets

(56) References Cited

U.S. PATENT DOCUMENTS

| | | |
|---|---|---|
| 7,293,556 B2 | 11/2007 | Baldauf et al. |
| 8,863,728 B2 | 10/2014 | Haskara et al. |
| 2012/0042850 A1 | 2/2012 | Haskara et al. |
| 2016/0208731 A1* | 7/2016 | Onder .................. F02D 41/3047 |
| 2017/0159597 A1* | 6/2017 | Omi ........................ F02D 41/28 |

FOREIGN PATENT DOCUMENTS

| | | |
|---|---|---|
| DE | 102004017052 A1 | 11/2005 |
| DE | 102011109482 A1 | 11/2012 |
| EP | 0259544 A1 | 3/1988 |
| WO | 8802811 A1 | 4/1988 |

* cited by examiner

METHOD FOR OPERATING AN INTERNAL COMBUSTION ENGINE

The present application is a 371 of International application PCT/EP2013/003869, filed Dec. 19, 2013, which claims priority of DE 10 2013 000 061.0, filed Jan. 2, 2013, the priority of these applications is hereby claimed and these applications are incorporated herein by reference.

BACKGROUND OF THE INVENTION

The invention relates to a method for operating an internal combustion engine and to an arrangement for carrying out the method In internal combustion engines, different injection systems are used. For example, a storage injection in which a high-pressure pump raises fuel to a high pressure level is referred to as common rail injection. The fuel passes into a pipeline system, the rail, in which this fuel is under pressure. The common rail system permits the separation of the generation of pressure from the natural injection process.

The internal combustion engine can basically be in a steady-state operating mode or in a transient operating mode. In the steady-state operating mode or state the rotational speed and the rail pressure have settled. In the transient operating mode this is not the case.

During the operation of an internal combustion engine, when the engine is tuned it is also necessary to define the injection start. Hitherto, the injection start was either not filtered at all or was filtered by means of a PT1 filter. The time constant of this PT1 filter is constant here. In order to permit a good steady-state behavior, this time constant must be set very high. This has the disadvantage that the injection start is excessively delayed in the case of transient processes.

SUMMARY OF THE INVENTION

Against this background a method and an arrangement for operating an internal combustion engine are proposed.

The method serves to operate an internal combustion engine, in which an injection start is calculated by a filter, starting from a standard injection start, the filter parameter of which filter is selected as a function of the operating state of the internal combustion engine.

In one refinement, the filter parameter is calculated as a function of a transient air mass ratio.

A filter time constant or a filter angle can be used as the filter parameter.

The filter parameter is typically set in such a way that a small delay behavior occurs for a transient operating mode and a strong delay behavior occurs for a steady-state operating mode.

In the method for operating an internal combustion engine, in which an injection start is calculated, starting from a standard injection start, there is consequently provision that this calculation is performed by a filter, the filter parameter of which filter is selected as a function of the operating state of the internal combustion engine.

Such an arrangement for carrying out the method is accordingly presented. This arrangement serves to operate an internal combustion engine, wherein the arrangement is configured to calculate an injection start by a filter, starting from a standard injection start, the filter parameter of which filter is selected as a function of the operating state of the internal combustion engine.

It has therefore been recognized that in the steady-state operating mode an injection start filter with a long delay time is required in order to reduce fluctuations in the injection start. In contrast, in the transient operating mode an injection start filter with a very short delay time is required. The requirements for both operating modes are therefore met with the presented method.

The presented method therefore permits a good filter behavior in the steady-state operating mode, either with a long time constant or a large filter angle, and at the same time a low filtering in the transient operating mode, either with a short time constant or a small filter angle. In this way steep gradients in the injection start characteristic diagram are made possible. Furthermore, in the transient operating mode emissions are reduced and the acceleration behavior is improved.

Further advantages and refinements of the invention can be found in the description and the appended drawings.

Of course, the features mentioned hereinabove and those still to be explained below can be used not only in the respectively specified combination but also in other combinations or alone, without departing from the scope of the present invention.

BRIEF DESCRIPTION OF THE DRAWING

The invention is illustrated schematically in the drawing on the basis of embodiments, and will be described in detail below with reference to the drawing.

DETAILED DESCRIPTION OF THE INVENTION

Figure 1:
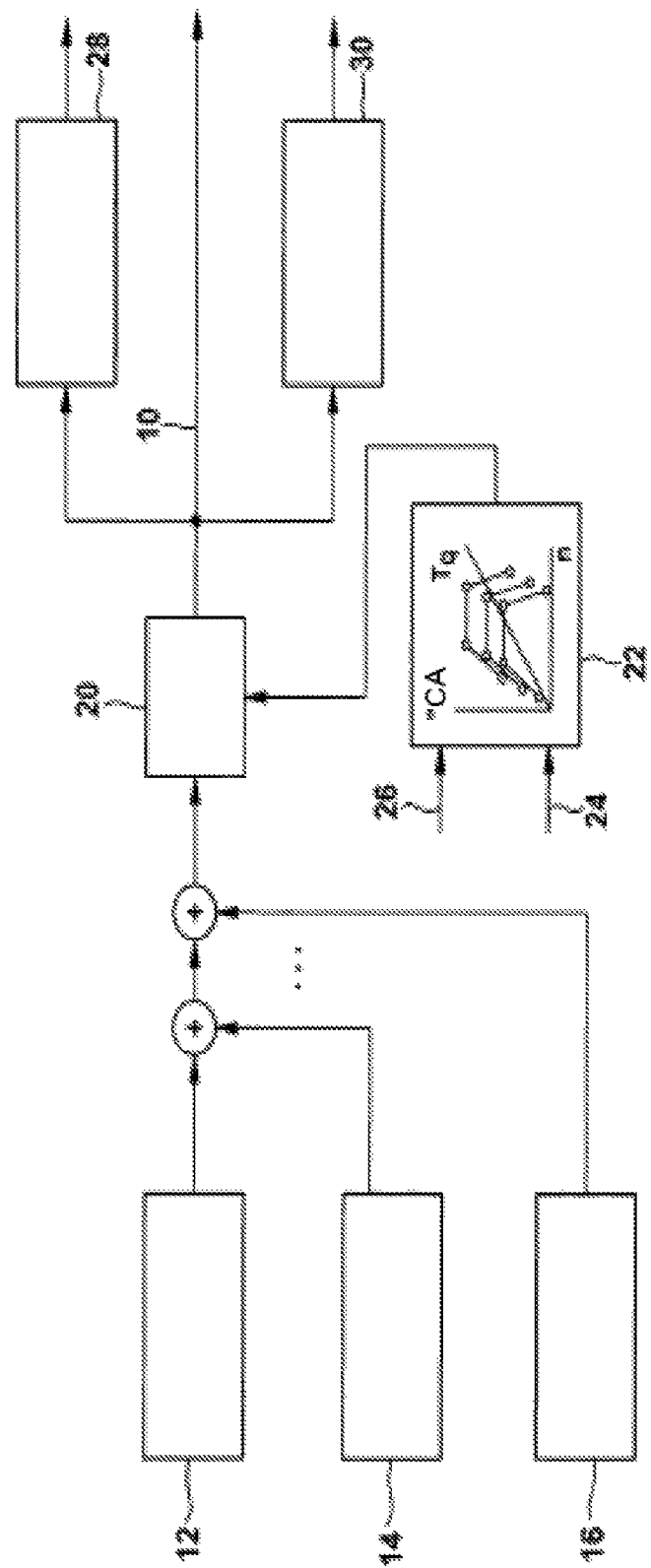
FIG. 1 shows a method for calculating the injection start.

FIG. 1 shows an overview image of the injection start calculation. The injection start of the main injection 10 is calculated starting from the standard injection start 12. The standard injection start 12 is corrected as a function of the air mass ratio 14, the ambient air pressure 16 and further variables. In this embodiment, the correction variables are added to the standard injection start. Subsequently, the injection start is limited to a maximum value 20. The latter is also defined by a characteristic diagram 22 with the input variables torque 24 and engine speed 26. The limited injection start represents the injection start of the main injection 10. From the latter, the injection start of the pre-injection 28 and of the post-injection 30 are derived.

Figure 16:
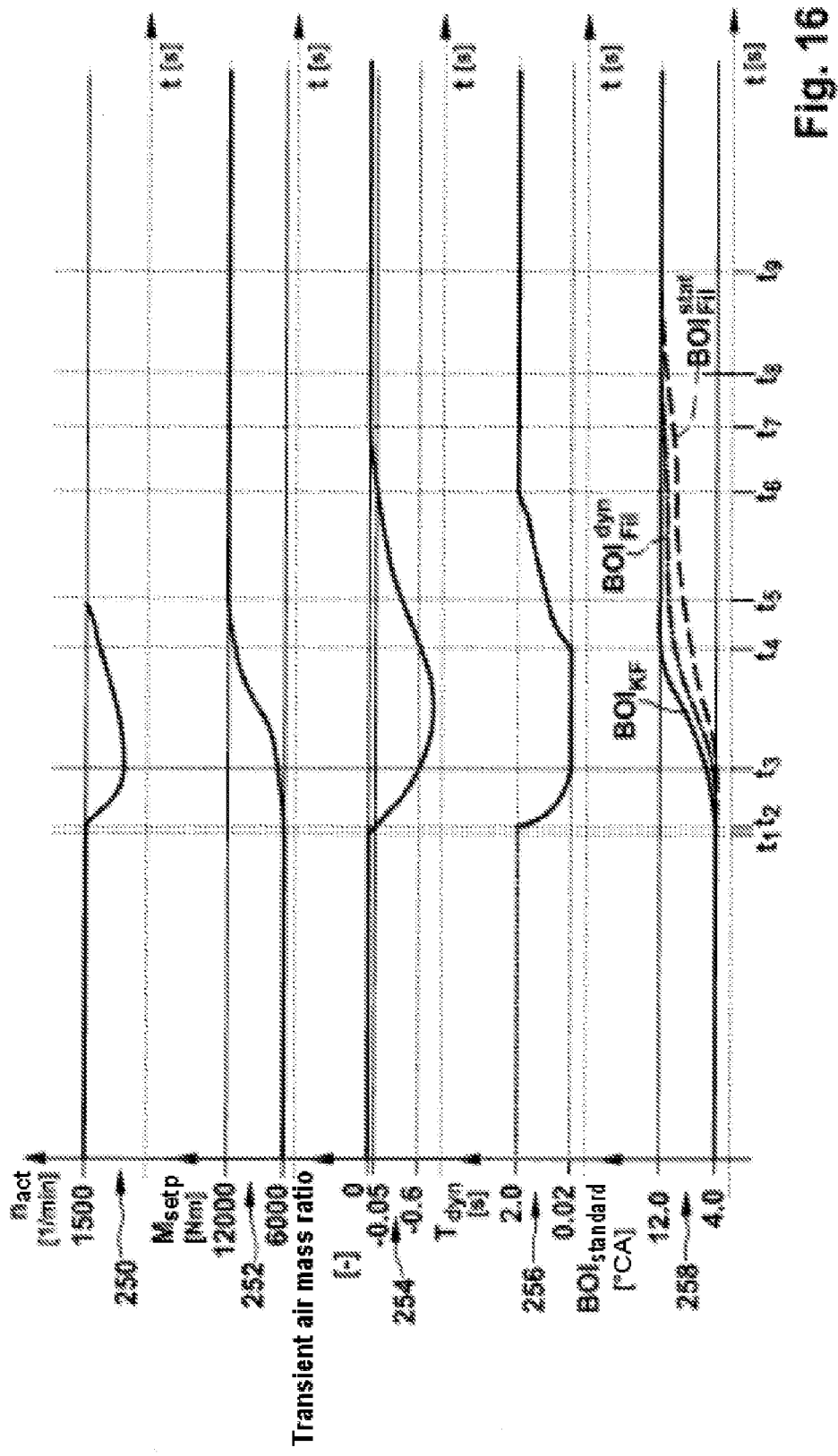
FIG. 16 shows time diagrams.

The calculation of the air mass ratio is illustrated in FIG. 16.

Figure 2:
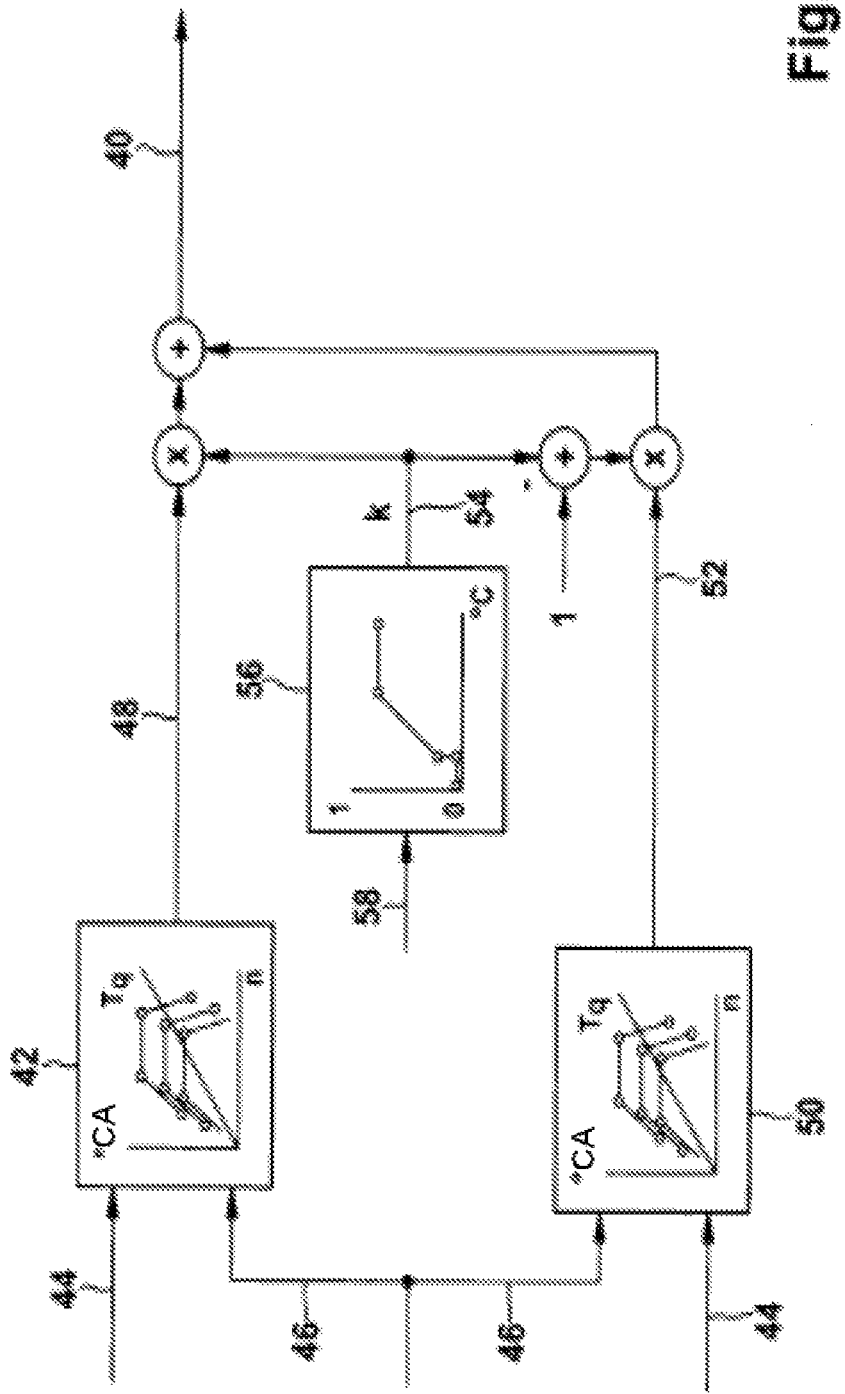
FIG. 2 shows the calculation of the standard injection start.

FIG. 2 shows the calculation of the standard injection start 40. From a first characteristic diagram 42 having the input torque variables of the engine speed 44 and the setpoint 46, the injection start is determined for the hot engine 48. The injection start for the cold engine is calculated from a second characteristic diagram 50 with the same input variables. Weighting between the two injection starts 48 and 52 is implemented using a weighting factor k 54. This weighting factor k 54 is the output variable of a characteristic curve 56 which has a virtual temperature of 58 as the input variable. The virtual temperature 58 results from two temperatures, for example the cooling water temperature and the charge air temperature. The following applies for the resulting injection start:

$$\text{injection start} = k*(\text{BOI}_{HotEngine}[°CA]) + (1-k)*(\text{BOI}_{ColdEngine}[°CA])$$

wherein $\text{BOI}_{HotEngine}$ [°CA] is equal to the injection start for the hot engine and $\text{BOI}_{ColdEngine}$ [°CA] is the injection start for the cold engine, specified in units of degree per crank angle before the top dead center.

The calculation of the injection start in this form is described in document U.S. Pat. No. 7,293,556 B2.

Figure 3:
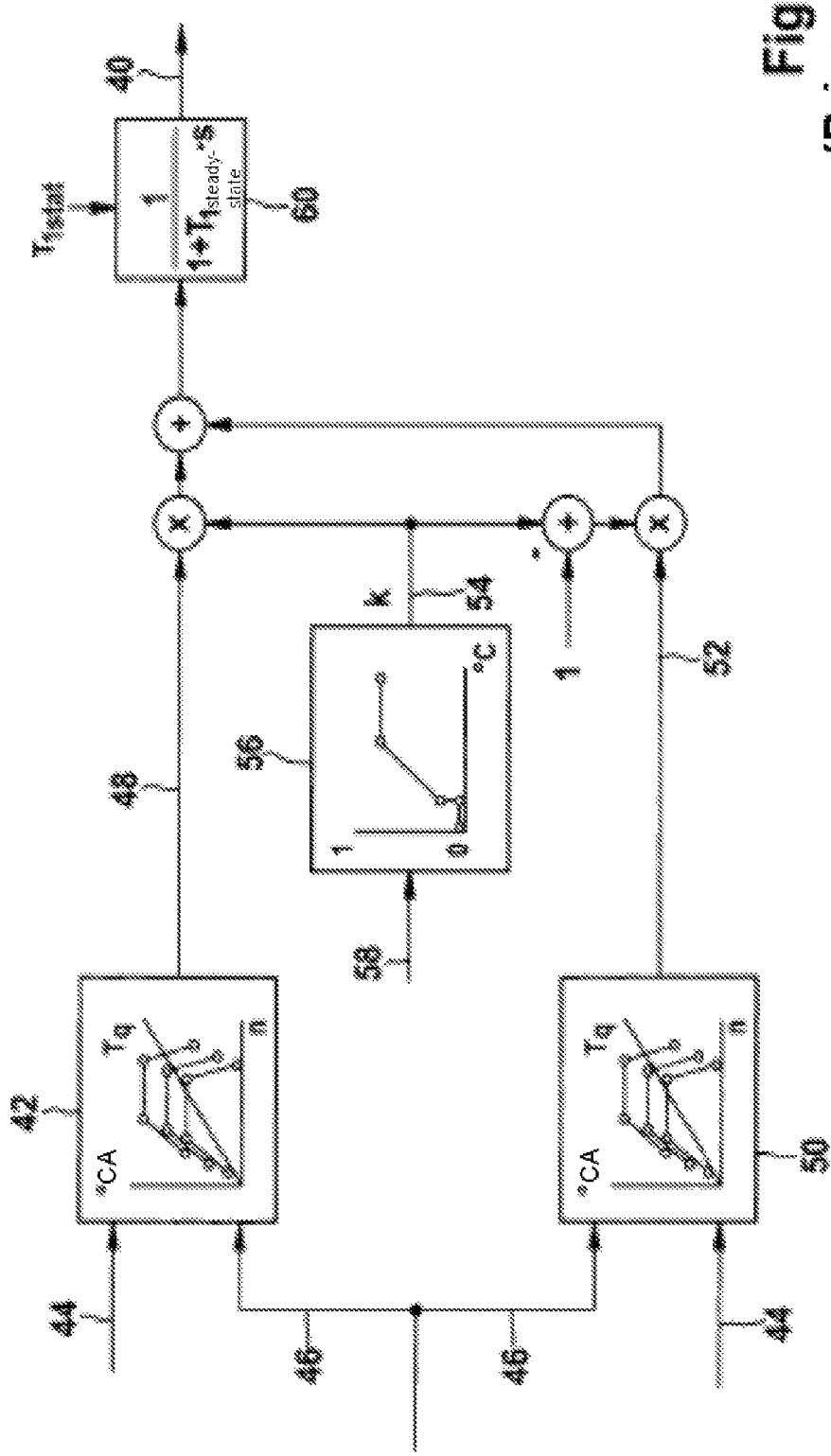
FIG. 3 shows the calculation of the standard injection start with a filter.

FIG. 3 shows that the injection start according to the prior art is filtered by a filter 60 of constant filter time constant. A PT1 filter with constant, static filter time constants $T_{lstat}$ is illustrated. The output variable of the filter 60 represents the standard injection start 40.

The test engineer has the function of configuring the two injection start characteristic diagrams 42 and 50. In this context, it is desired to set the characteristic diagrams 42 and 50 as flexibly as possible. This means that even very steep gradients should be possible without making the internal combustion engine or the engine unstable.

Steep gradients in the injection start characteristic diagram 42 and 50 lead in the steady-state operating mode to a strongly fluctuating injection start upstream of the injection start filter 60. In order to damp these fluctuations, the time constant must be selected to be very long. This in turn leads to a situation in which in non-steady-state processes the injection start is severely delayed, which can have adverse effects on the load take-up behavior and the emission behavior of the engine.

In conjunction with the presented method, an injection start filter has now been developed which has a very strong delay behavior in the steady-state operating mode, and has only a very small or no delay behavior in the transient operating mode. Thereby the test engineer is enabled to configure the two injection start characteristic diagrams 42 and 50 in virtually any desired way without having to accept disadvantages in the transient operating mode. In addition, with such a filter it is possible to reduce emissions, since the injection start in the transient operating mode has a better transition behavior, i.e. a shorter reaction time.

Figure 4:
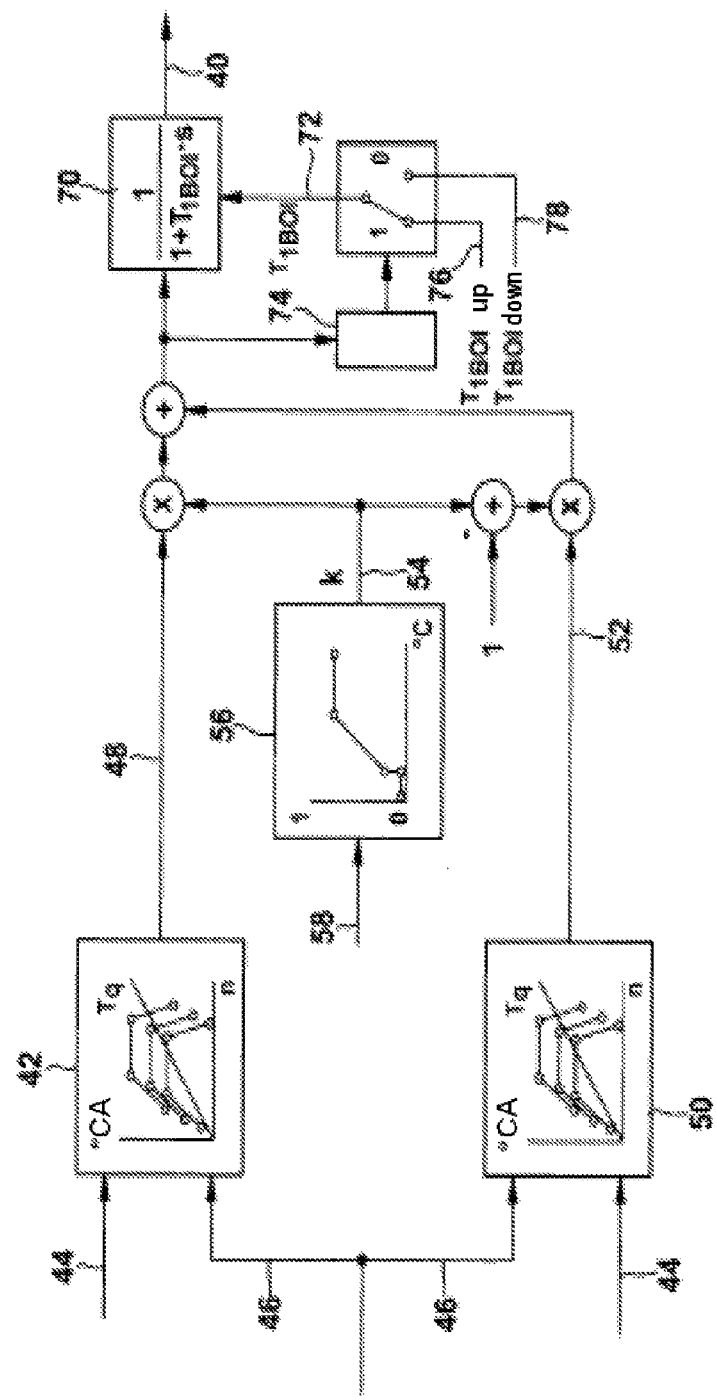
FIG. 4 shows an injection start filter.

FIG. 4 shows a further injection start filter. Reference numbers are correspondingly assigned to FIG. 3. In the case of the filter 70 in FIG. 4, the time constant 72 depends on the gradients 74 of the injection start. If the gradient of the injection start is positive, i.e. the injection start rises, the time constant is identical to the time constants $T_{1BOIup}$. If the gradient of the injection start is negative, i.e. the injection start decreases, the time constant is identical to the time constants $T_{1BOIdown}$.

With this filter, the time constant can therefore be set differently for a rising and a decreasing injection start.

In order to have a good filtering effect in the steady-state operating mode, it is, however, also necessary to select large values for the time constants with this filter, as a result of which the injection start is in turn severely delayed in the case of non-steady-state processes.

Figure 5:
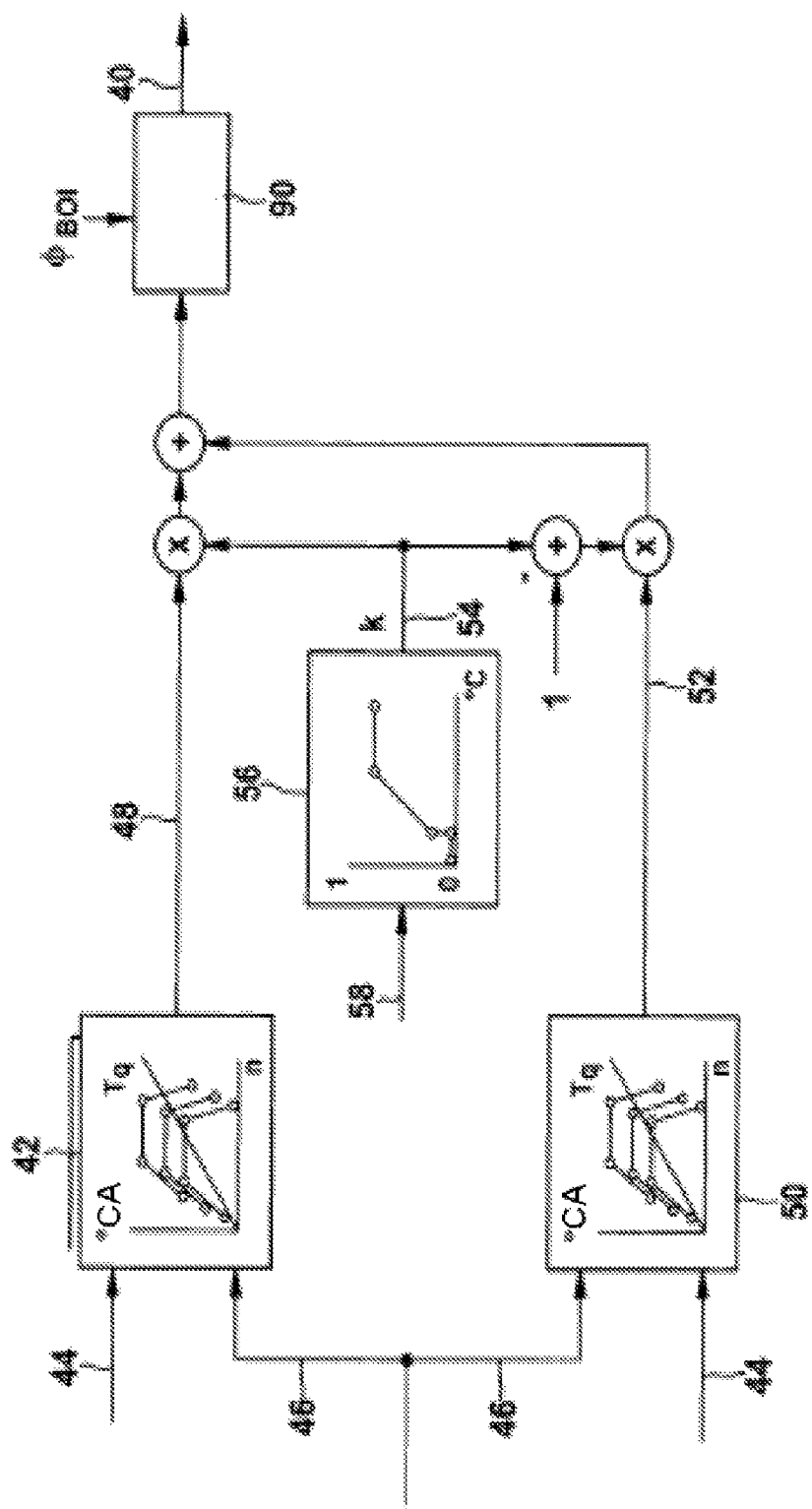
FIG. 5 shows a mean value filter.

FIG. 5 shows an injection start filter 90 which averages the injection start over a constant crank shaft angle $\Phi_{BOI}$, i.e. a mean value filter. A filter which averages the injection start over a constant time is also conceivable here.

Figure 6:
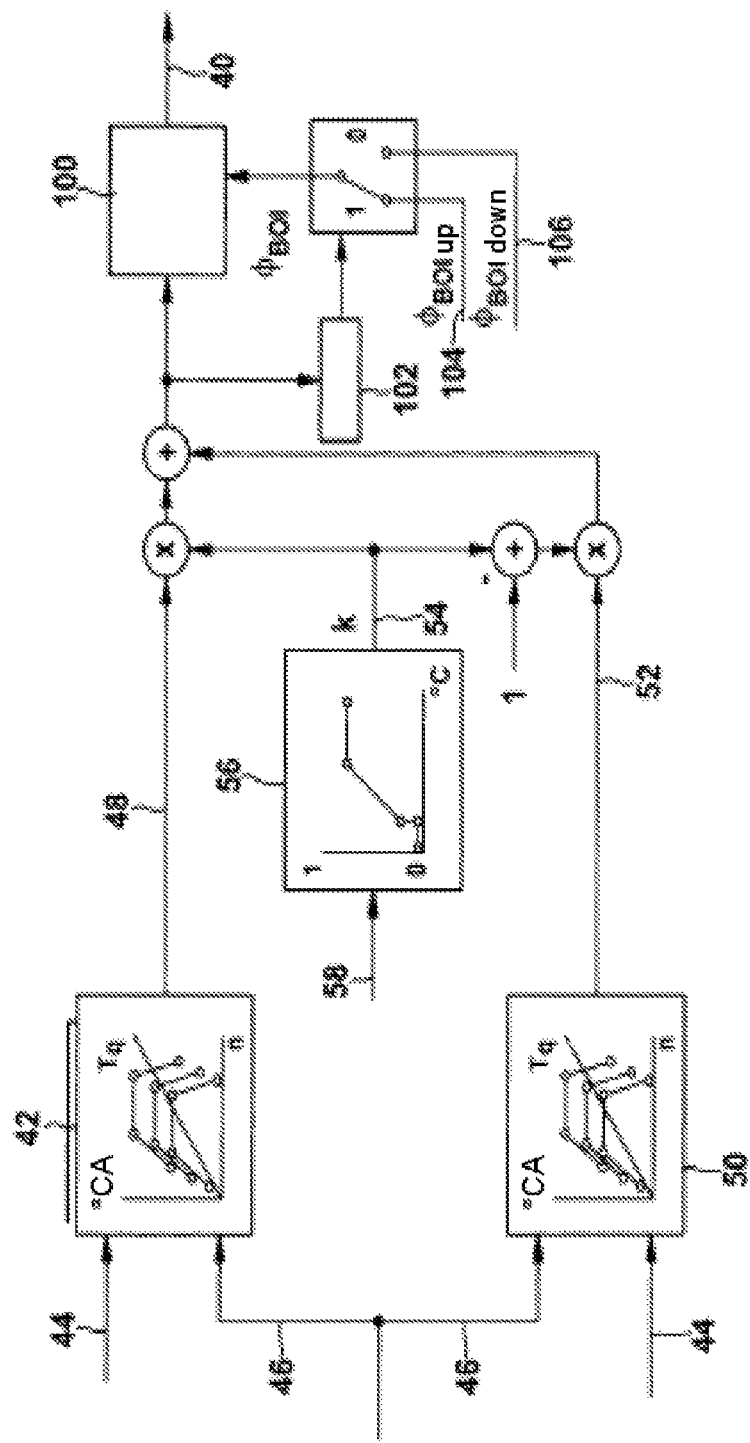
FIG. 6 shows a further mean value filter.

FIG. 6 shows a mean value filter 100 in which the filter angle $\Phi_{BOI}$ is calculated as a function of the injection start gradient 102. Given a rising injection start, the filter angle assumes the value 104, and given a falling injection start it assumes the further value 106. With this filter, the filter angle can therefore be set differently for a rising injection start and a falling injection start. In order to achieve a good filter effect in the steady-state operating mode, large filter angles $\Phi_{BOI}$ must be selected on the mean value filter is 90 and 100 in FIGS. 5 and 6. With these filters 90 and 100 this also leads to a situation in which the injection start is delayed strongly in non-steady-state processes, which in turn can have negative effects on the load take-up behavior and the emission behavior of the engine.

Figure 7:
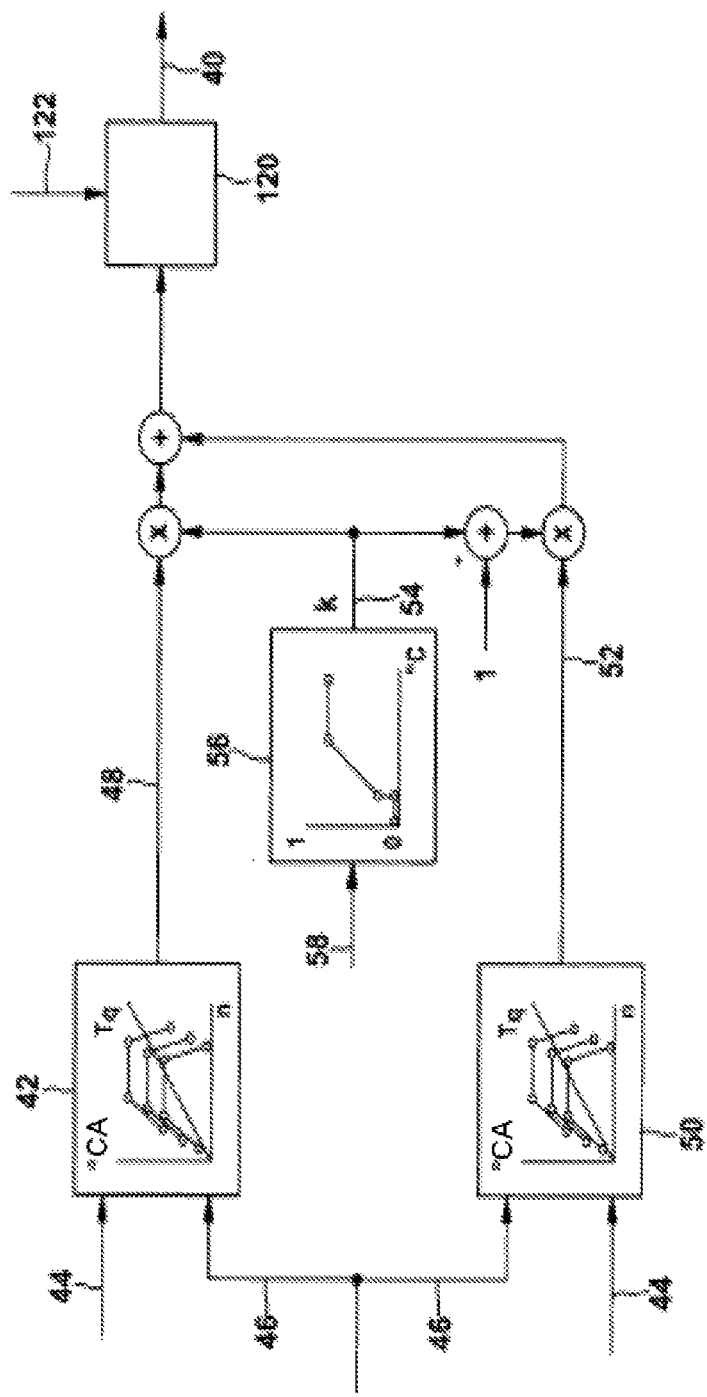
FIG. 7 shows an injection start filter according to the presented method.

FIG. 7 shows an injection start filter 120 according to the presented method with the transient air mass ratio 122 as input variable. This filter 120 is illustrated in more detail in FIG. 8 together with the calculation of the transient air mass ratio. Within the sense of the invention, any signal which permits differentiation between the steady-state operating mode and the transient operating mode can be used here an in input signal of the filter.

The current air mass 136 is calculated from the charge air pressure 130, the charge air temperature 132 and the cylinder volume 134. Depending on the charge air switch state 142, the standard air mass 146 is calculated from the engine setpoint 138 and the engine rotation speed 140, on the basis of the load shifting state 142, from a 3D characteristic diagram 144. The current air mass ratio 136 is then divided by the standard air mass 146 which represents the dimensionless current air mass ratio 150. This is filtered using a PT1 filter 152. The output variable of this filter 152 is the filtered air mass ratio 154.

The transient air mass ratio 160 is obtained as a difference between the current dimensionless air mass ratio 150 and the filtered air mass ratio 154.

The time constant $T_{dyn}$ 165 of the injection start filter 166 is no longer predefined in a constant way but instead calculated according to the invention by means of a two-dimensional curve 162 as a function of the transient air mass ratio 160.

Figure 9:
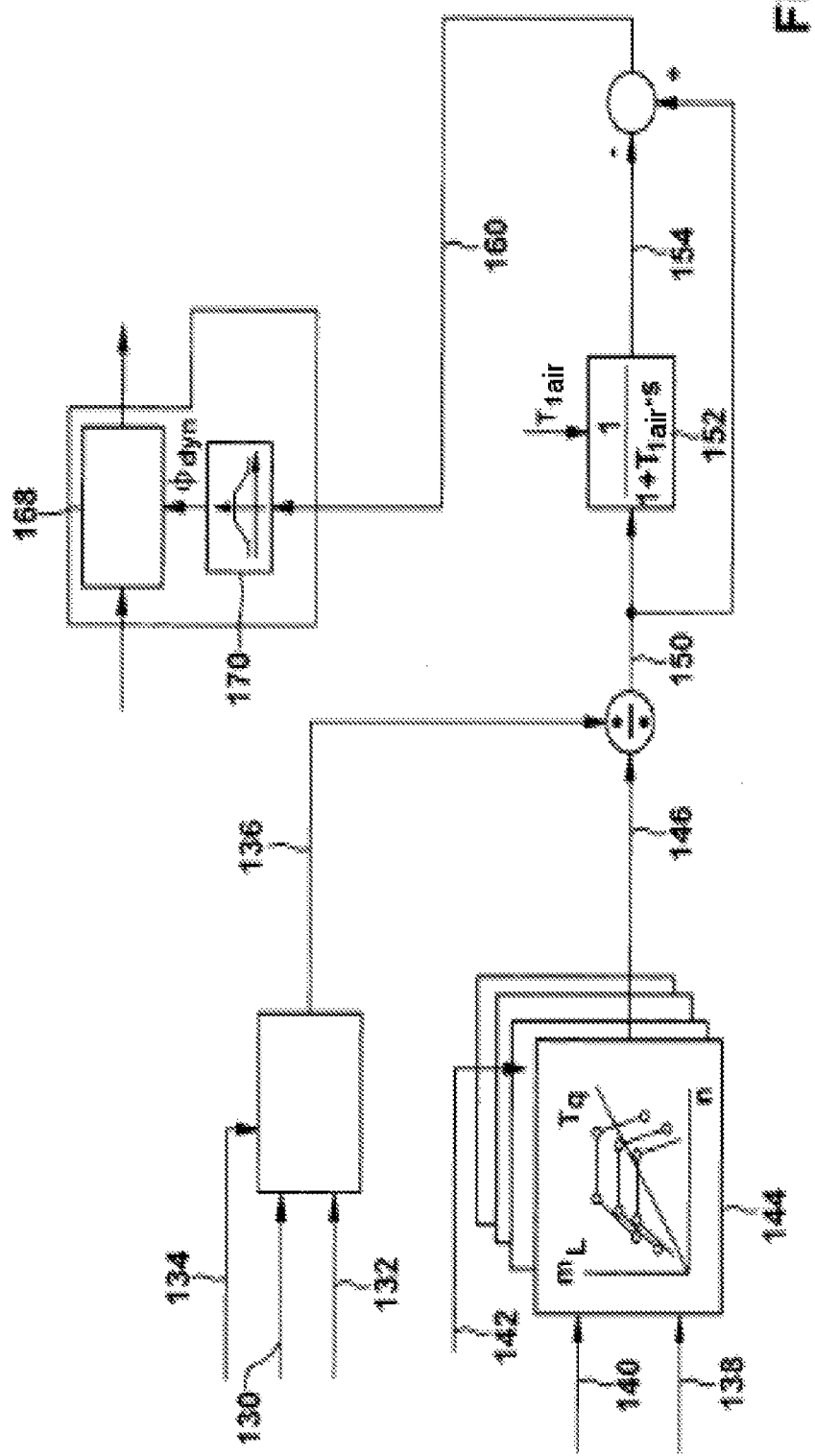
FIG. 9 shows a further embodiment of the described method.

FIG. 9 shows, as an embodiment of the invention, a mean value filter 168 the filter angle $\Phi_{dyn}$ of which is also calculated by means of a two-dimensional curve 170, as a function of the transient air mass ratio 160.

A mean value filter which averages the injection start over a specific filter time $\Delta t_{dyn}$ would also be conceivable, where this filter time is in turn calculated by means of a two-dimensional curve as a function of the transient air mass ratio 160.

Figure 10:
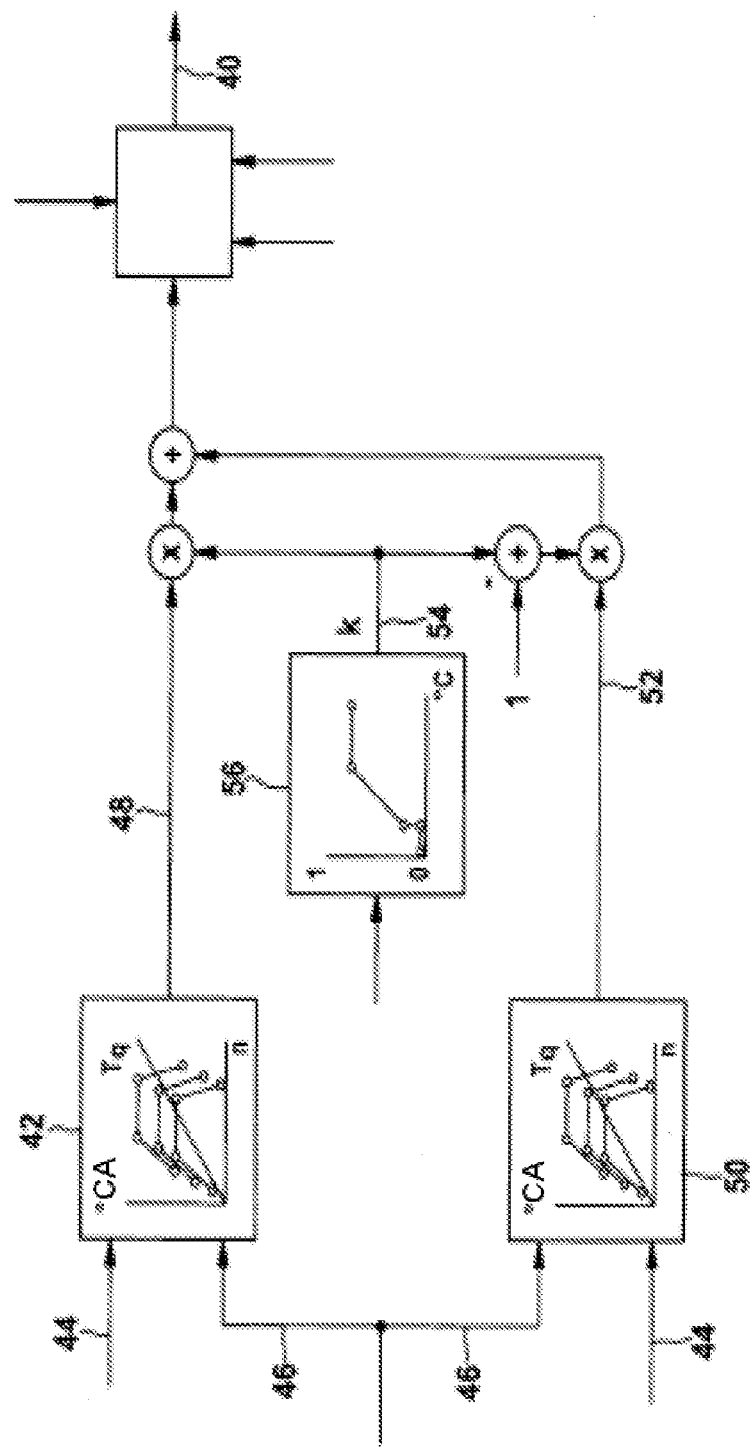
FIG. 10 shows another embodiment of the described method.
Figure 11:
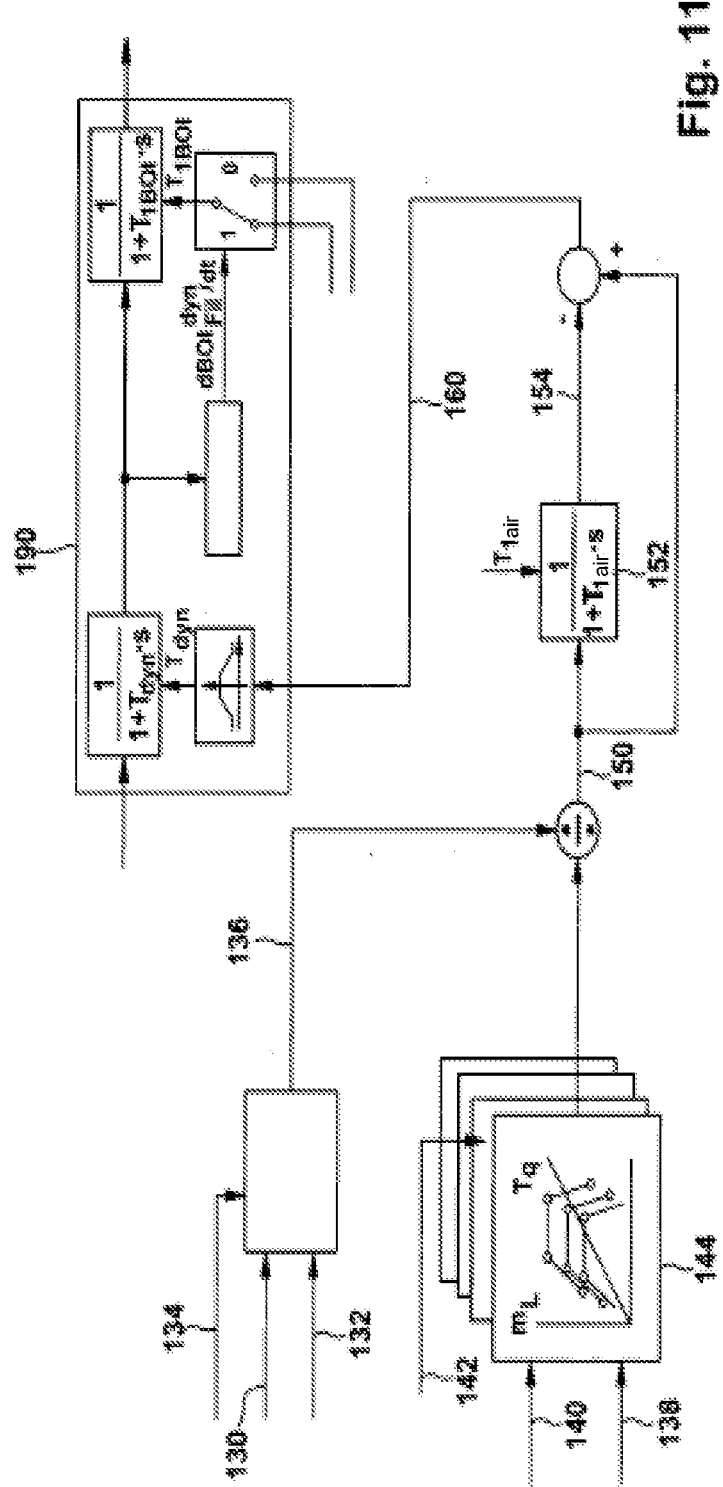
FIG. 11 shows a further embodiment of the described method.
Figure 12:
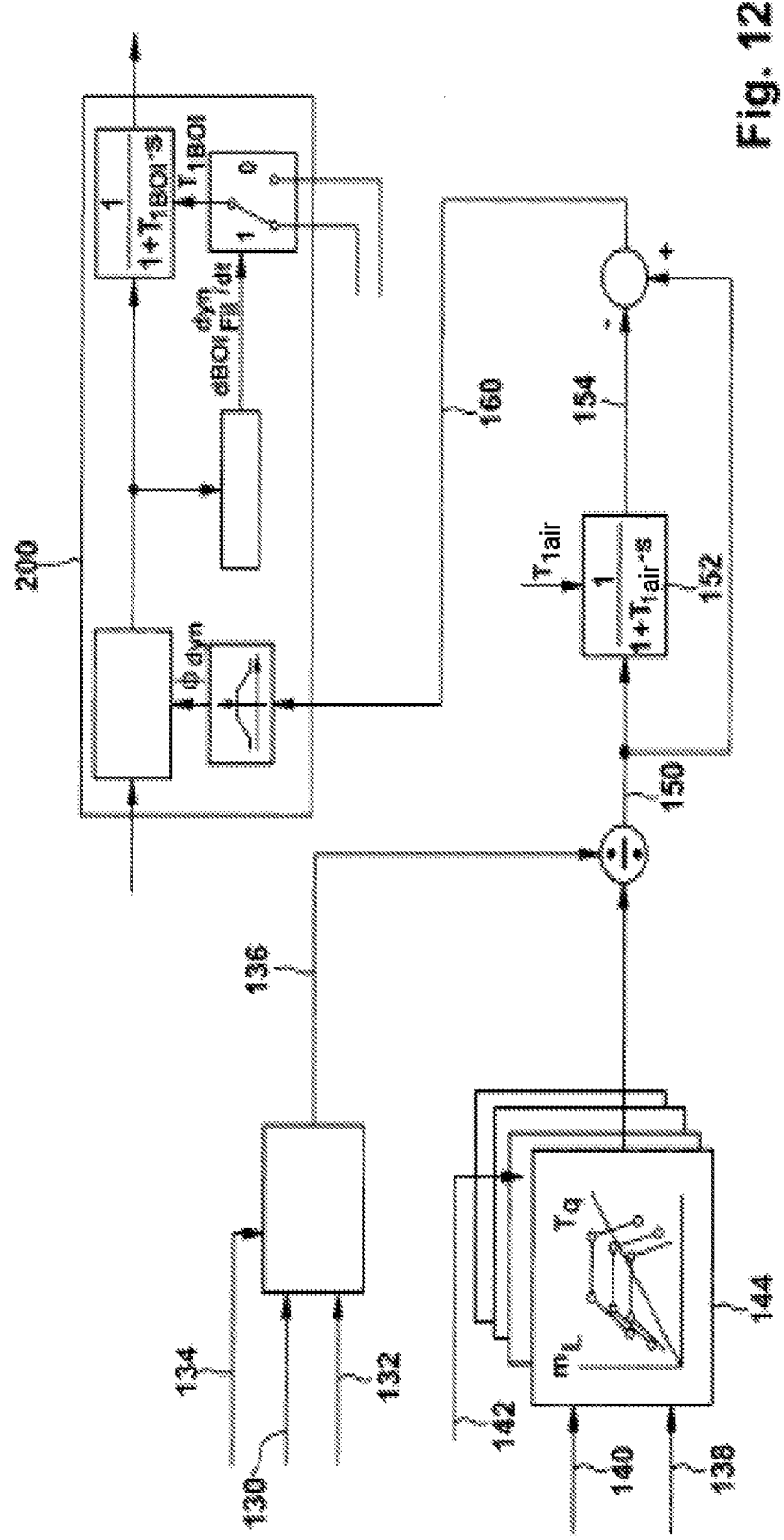
FIG. 12 shows a further embodiment of the described method.

FIGS. 10, 11 and 12 show further embodiments of the invention. The filters illustrated in FIGS. 8 and 9 with the dynamic filter time constants or dynamic filter angle are combined here with a filter with injection-start-gradient-dependent time constants (cf. FIG. 4) The advantage of these filters is that, depending on the desire of the test engineer, the injection start in the transient operating mode can, for example, be delayed only in one direction i.e. in the case of a falling or rising injection start, and remain undelayed in the other direction, or it is possible to delay the injection start differently in both directions.

Figure 13:
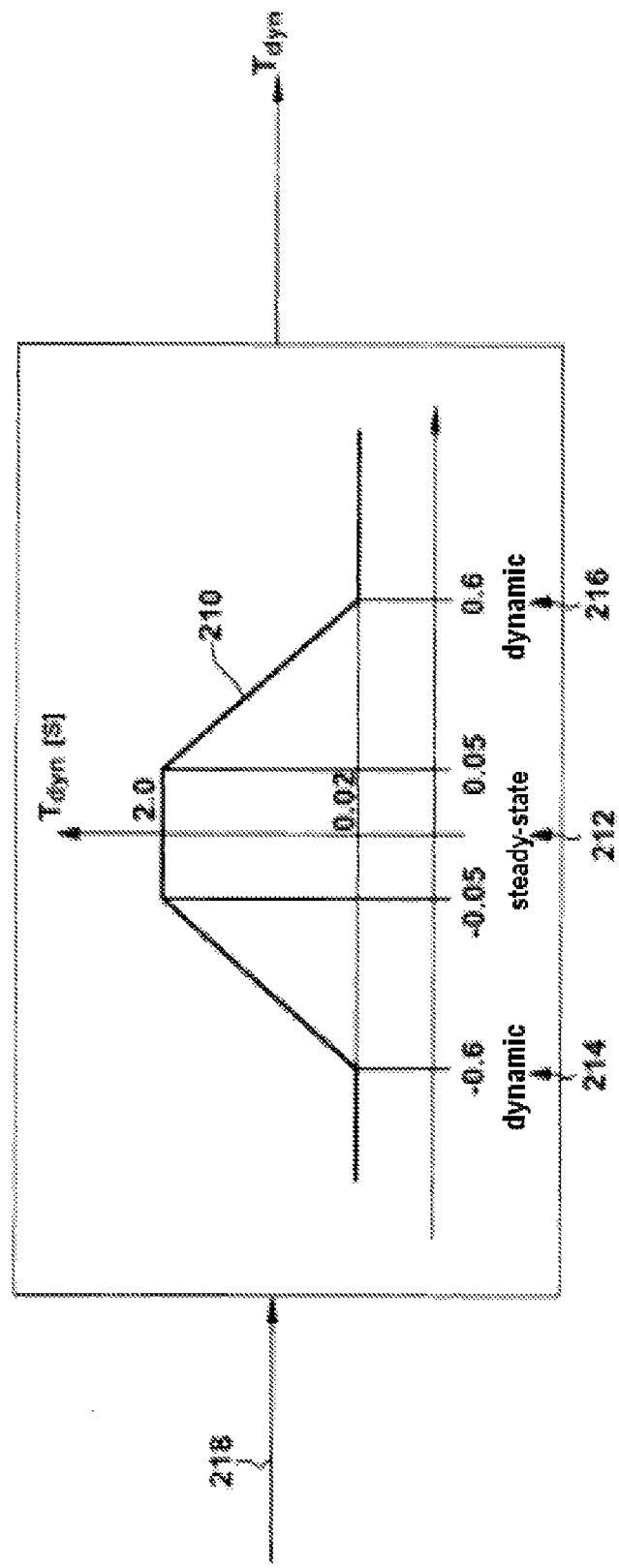
FIG. 13 shows the calculation of the dynamic time constants.

FIG. 13 shows for example a two-dimensional curve 210 by means of which the dynamic time constant $T_{dyn}$ of the injection start filter is calculated. The curve is divided here into three regions, a steady-state region 212 and two dynamic regions 214 and 216. The steady-state region 212 of the curve 210 represents the steady-state operating range of the engine. The transient air mass ratio 218 assumes here, for example, values between −0.05 and 0.05. In the steady-state operating range of the engine, the time constant of the filter is to assume large values about, for example 2 seconds, which brings a good filtering of the injection start.

In the case of a transient process, for example a load shift, a transient air mass ratio 218 assumes relatively large values in terms of absolute value and in the case of load connection these are negative and in the case of load disconnection these are positive. For an air mass ratio which becomes larger in terms of absolute value, a dynamic time constant $T_{dyn}$ which is becoming smaller is defined, with the result that two falling curve branches occur. If the transient air mass ratio exceeds, for example, the value 0.6 in terms of absolute value $T_{dyn}$ is kept constant at the very small value 0.02 seconds.

Figure 14:
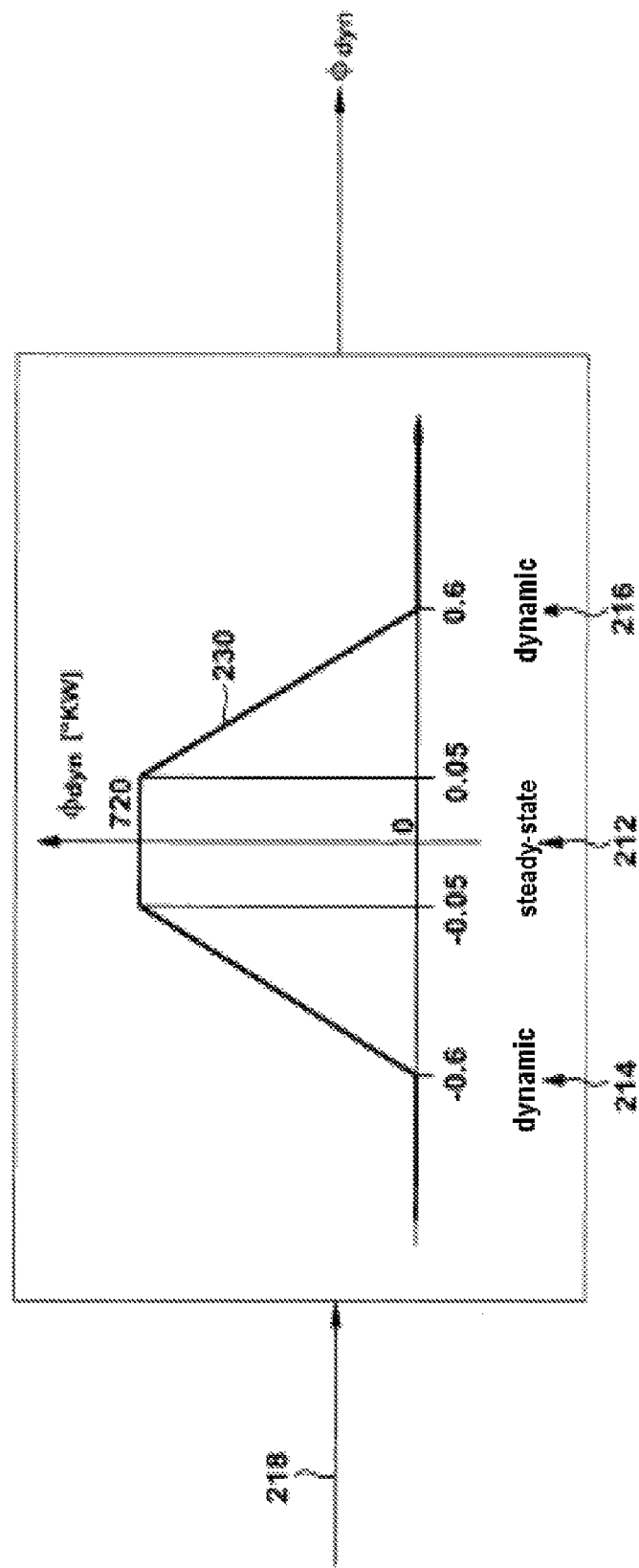
FIG. 14 shows the calculation of the dynamic filter angle.
Figure 15:
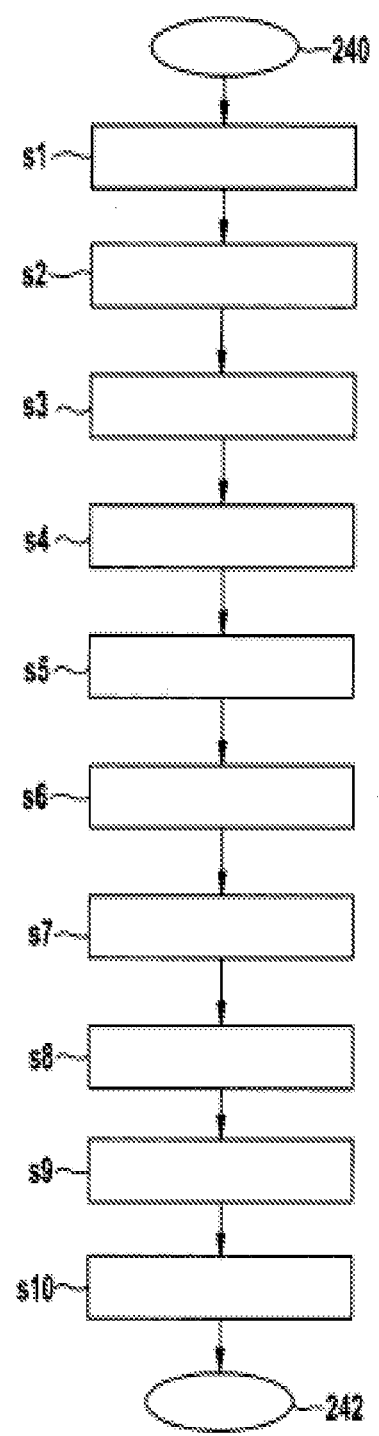
FIG. 15 shows the calculation of the injection start in a flow chart.

FIG. 14 illustrates the corresponding curve 230 for the calculation of the dynamic filter angle $\Phi_{dyn}$ in more detail. The steady-state operating range is delimited here in turn by the two values −0.05 and 0.05 of the air mass ratio. The filter angle is 720° crank angle in this range. The dynamic (non-steady-state) range is defined by values of the transient air mass ratio which are larger than 0.05 in terms of absolute value. As the air mass ratio becomes larger in terms of absolute value, the filter angle decreases here, as a result of which the effect of the filter becomes ever smaller. Finally, when the air mass ratio reaches the value 0.6 in terms of absolute value, the filter angle is identical to 0° crank angle, as a result of which the filter is deactivated.

With the two curves illustrated in FIGS. 13 and 14, according to the invention the injection start in the steady-state operating mode is filtered very strongly, which permits a high degree of flexibility in the configuration of the injection start characteristic diagrams.

In contrast, in the transient operating mode the injection start is filtered only very weakly, or not at all. As a result, the load take-up behavior of the engine is not adversely affected and the emission values are not worsened.

Figure 8:
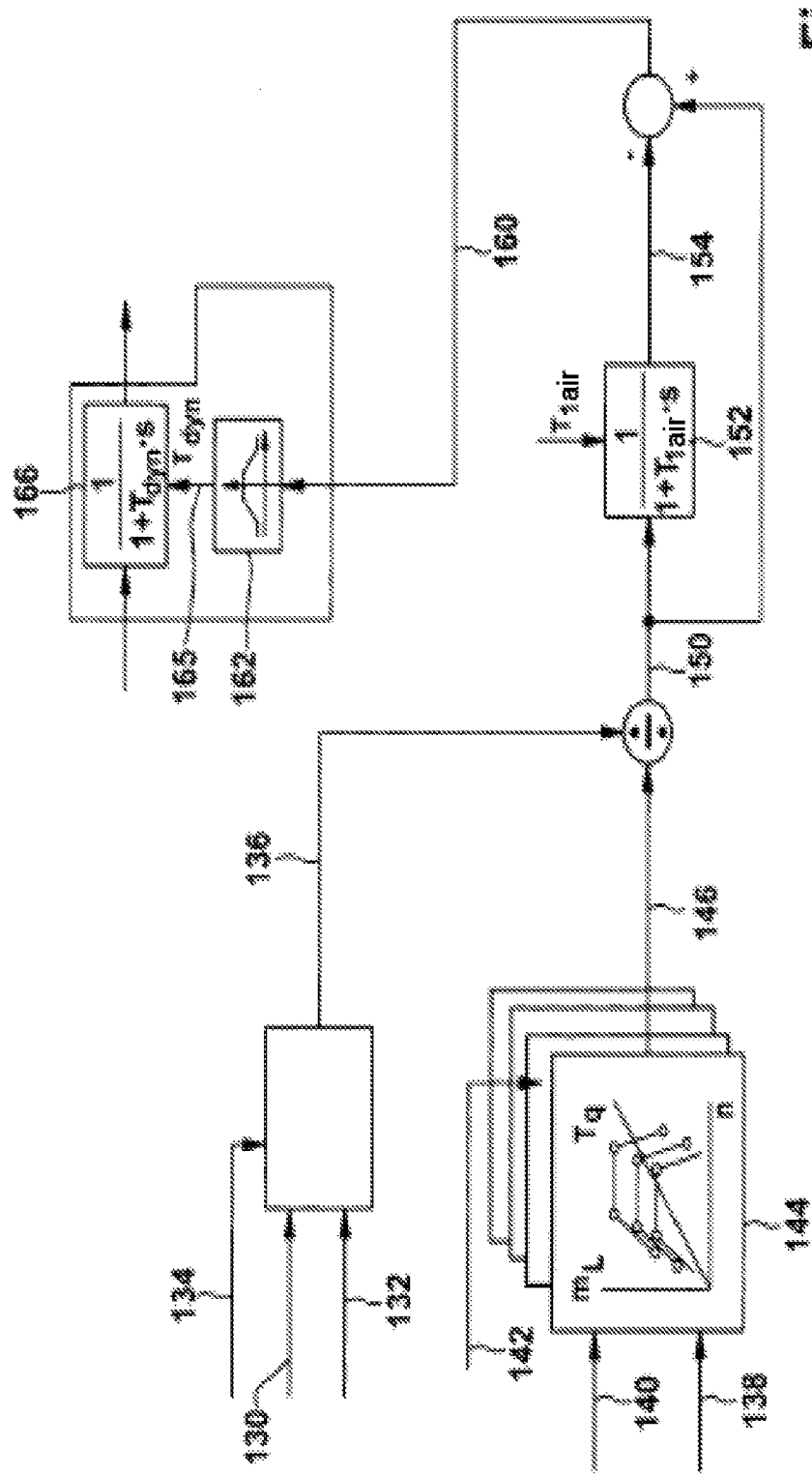
FIG. 8 shows an embodiment of the described method.

FIG. 14 illustrates a flowchart relating to the calculation of the injection start corresponding to FIG. 8. After the start 240, in step S1 the engine rotational speed is calculated. In step S2, the setpoint torque is calculated. In step S3, the standard air mass is calculated. This is the output variable of a three-dimensional characteristic diagram with the input variables of the engine rotational speed and setpoint torque. In step S4, the current air mass is calculated as a function of the charge air pressure, the charge air temperature and the cylinder volume. In step S5, the air mass ratio is calculated from the current air mass and the standard air mass. In step S6, the air mass ratio is filtered by means of a PT1 filter.

In step S7, the transient air mass ratio is calculated from the filtered air mass ratio and the current air mass ratio. In step S8, the dynamic filter time constant $T_{dyn}$ is calculated from the transient air mass ratio from two-dimensional characteristic curve. In step S9, the unfiltered injection start is calculated from the engine rotational speed, the setpoint torque and the virtual temperature. In step S10, the filtered injection start is calculated using the injection start filter. The injection start filter uses here the dynamic filter time constant $T_{dyn}$. To this end the program sequence path 242 ends.

FIG. 16 illustrates time diagrams of a load connection process of a generator/engine. The first diagram 250 shows the engine rotational speed. At the time $t_1$, the load is connected, which brings about a dip in the engine rotational speed. At the time $t_5$ the engine rotational speed has settled again to the setpoint rotational speed (1500 l/min).

The second diagram 252 shows the setpoint torque of the engine. When the engine rotational speed dips, the rotational speed regulator increases the setpoint torque, with the result that it rises starting from the time $t_1$. At the time $t_5$, the setpoint torque has also settled.

The third diagram 254 shows the transient air mass ratio. In the steady-state operating mode, i.e. before the time $t_1$, the transient air mass ratio has the value zero. With the connection of the load at time $t_1$, the current air mass ratio drops, while the filtered air mass ratio firstly changes only a little. This leads to a situation in which the transient air mass ratio becomes negative. At the times $t_2$ and $t_6$, the transient air mass ratio assumes the value −0.05, and at the times $t_3$ and $t_4$ it assumes the value −0.6. At the time $t_7$ the transient air mass ratio has again settled at the steady-state value zero.

The fourth diagram 256 shows the time constant $T_{dyn}$ of the high-pressure filter which is calculated from the transient air mass ratio, corresponding to FIG. 13. In the steady-state operating mode, that is to say up to the time $t_1$, the time constant assumes the value 2.0 seconds. Starting from the time $t_2$, the time constant becomes shorter, since the transient air mass ratio undershoots the value −0.05 at this time. From the time $t_3$ to the time $t_4$, the transient air mass ratio becomes smaller or equal to the value −0.06. Therefore, the time constant of the injection start filter assumes the value 0.02 seconds in this time range corresponding to FIG. 13. At the time $t_6$, the transient air mass ratio again exceeds the value −0.05 and subsequently settles to the value zero. This leads to a situation in which the time constant of the injection start filter rises, in accordance with FIG. 13, from the time $t_4$ to the time $t_6$ from the value 0.02 seconds to the value 2.0 seconds, and is consequently identical to this value.

The fifth diagram 258 shows the injection start before and after the injection start filter for that case in which a dynamic time constant corresponding to FIG. 13 is used for the injection start filter. For comparison, the dashed line illustrates a profile of the injection start for the case in which a constant time constant of 2.0 seconds is used. In the steady-state operating mode before the time $t_1$, the injection start has respectively the value 4.0° crank angle. With the connection of the load and simultaneous dipping of the engine rotational speed, the injection start respectively begins to rise. The injection start before the injection start filter reaches its steady-state final value of 12° crank angle at the time $t_5$, since at this time the engine rotational speed and the setpoint torque have settled at their steady-state final values. The injection start after the filter reaches the steady-state final value at the time $t_7$ if the dynamic time constant $T_{dyn}$ is used (dotted line).

If a constant time constant of 2.0 seconds is used, the injection start does not reach its steady-state final value until the time $t_9$. It is apparent that a dynamic filter time constant permits a better transition behavior of the injection start than a static, constant filter time constant without having to accept worsening of the steady-state filter behavior.

With the presented method, a series of advantages can be achieved, at least in some of the embodiments. Therefore, a better transition behavior of the injection start is possible in the transient operating mode. In this way, the emissions in the case of the transient engine operating mode can be reduced. Furthermore, a better acceleration behavior or load take-up behavior of the engine can be achieved, in particular in the case of a rise in injection start, since the injection start rises more quickly in this case and an early injection start is expedient for the dynamic behavior.

Furthermore, it is to be noted that the test engineer has significantly more degrees of freedom when configuring the injection start characteristic diagrams, since steep gradients in the characteristic diagram do not bring about instabilities. Furthermore, in the steady-state operating mode a filter with a very good filter effect, specifically a slow filter, can be used, without the transient operating mode being adversely affected.

The invention claimed is:

1. A method for operating an internal combustion engine, comprising the steps of: determining an injection start using a first filter and a second filter, starting from a standard injection start; and selecting at least one filter parameter as a function of an operating state of the internal combustion engine, wherein a filter parameter of the second filter depends on a gradient of an injection start.

2. The method as claimed in claim 1, including calculating the filter parameter for the first filter as a function of a transient air mass ratio, which is calculated from an actual air mass ratio and a filtered air mass ratio, wherein the air mass ratio is calculated as a function of the current air mass to the standard air mass.

3. The method as claimed in claim 2, including setting the filter parameter so that a delay behavior occurs for a transient operating mode.

4. The method as claimed in claim 2, including setting the filter parameter so that a strong delay behavior occurs for a steady-state operating mode.

5. The method as claimed in claim 2, including using a filter time constant as the filter parameter for the first filter.

6. The method as claimed in claim 5, including using a filter angle as the filter parameter for the first filter.

7. The method as claimed in claim 1, including using a filter time constant as the filter parameter for the second filter.

8. The method as claimed in claim 1, including using a filter angle as the filter parameter for the second filter.

* * * * *